J. DAVIS.
Wheel-Cultivator.
No. 43,395. Patented July 5, 1864.
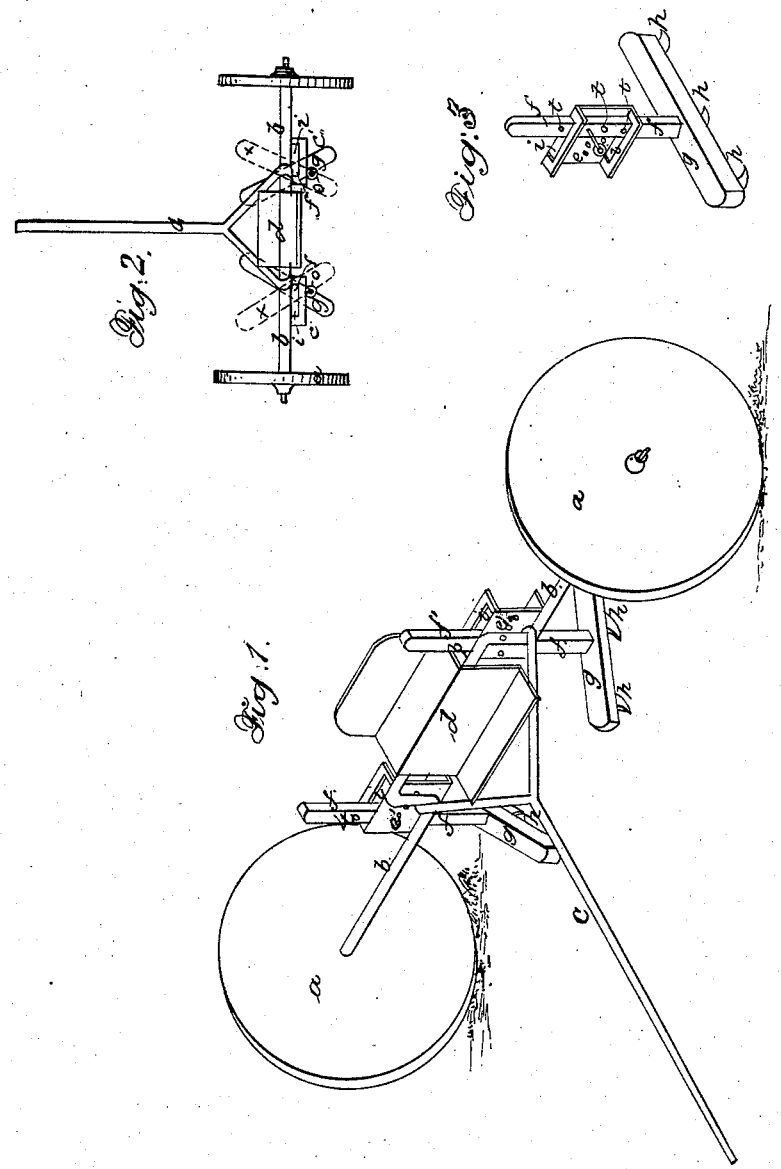
WITNESSES:
James J. Johnston
Alexander Hays
INVENTOR:
John Davis

UNITED STATES PATENT OFFICE.

JOHN DAVIS, OF ALLEGHENY CITY, PENNSYLVANIA.

IMPROVEMENT IN CULTIVATORS.

Specification forming part of Letters Patent No. 43,395, dated July 5, 1864.

*To all whom it may concern:*

Be it known that I, JOHN DAVIS, of Allegheny City, in the county of Allegheny and State of Pennsylvania, have invented a new and Improved Cultivator; and I do hereby declare that the following is a full and exact description thereof, reference being had to the accompanying drawings, and to the letters of reference marked thereon.

The nature of my invention consists in an arrangement of movable, variable, and adjustable bars to which are attached cultivator-teeth, the whole being constructed, arranged, and operating in the manner hereinafter described.

To enable others skilled in the art to make and use my invention, I will proceed to describe its construction and operation.

In the accompanying drawings, Figure 1 is a perspective view of the cultivator. Fig. 2 is a top view of the same. Fig. 3 is a perspective view of one of the bars to which the cultivator-teeth are attached, and also represents the parts used for the purpose of securing the teeth and their bars to the axle of the cultivator.

$a$ represents the wheels. $b$ represents the axle, to which is attached the tongue $c$ and the pieces $e$ and $e'$, which are furnished with slots $i$. $d$ represents the seat for the driver. $g$ represents the bars to which the cultivator-teeth $h$ are attached. The bars $g$ are attached to the uprights $f$ and $f'$, which are furnished with a number of screw-holes, $t$. The upright pieces $f$ and $f'$ are placed in the slots $i$ of the pieces $e$ and $e'$, and secured in the desired position by means of the set-screws $o$. The bars $g$ are attached to the uprights $f$ and $f'$, so as to stand in an oblique angle to the axle $b$, as represented in Figs. 1 and 2. The teeth $h$ are of the mold-board form, or resemble one-half of the blade of the common shovel-plow. It will be observed that the bars $g$ can be raised or lowered by simply raising or lowering the uprights $f$ and $f'$ in the slots $i$ of the pieces $e$ and $e'$, which will cause the teeth $h$ to take a deeper or a less hold in the ground; and it will also be observed that the upper ends of the uprights $f$ and $f'$ may be inclined toward each other or turned from each other, which will cause the teeth $h$ to hill up the earth more or less, according to the position of the uprights and teeth; and it will be further observed that by the use of the slots $i$ the uprights $f$ and $f'$ and bars $g$ may be brought closer together or placed farther apart, thereby adapting the cultivator to any and every variation of width between the rows of the things planted.

The operation of my improvement is as follows: Having all things constructed as herein described and represented, I set the uprights $f$ and $f'$ so that the teeth $h$ will produce the effect desired—that is to say, if I desire to cut down the weeds and mellow up the ground I change the position of the uprights $f$ and $f'$, with their bars $g$ and teeth $h$, so that the upright $f$ shall be in the piece $e'$ and the upright $f'$ shall be in the piece $e$. The bars $g$ will then be in the position represented by the dotted lines marked $x$. When the bars $g$ are in this position the teeth $h$ will cut down the weeds, mellow up the ground, and throw off the earth from the young plants, which is very desirable when the plants are very young.

When the uprights $f$ and $f'$, bars $g$, and teeth $h$ are in the position represented in Fig. 1 the teeth $h$ will then cut down the weeds and hill up the earth around the plants.

Having thus described the nature, construction, and operation of my improvement, what I claim as of my invention is—

The arrangement of the pieces $e$ and $e'$, uprights $f$ and $f'$, and bars $g$, with teeth $h$, the whole being constructed, arranged, and operating substantially in the manner herein described, and for the purpose set forth.

JOHN DAVIS.

Witnesses:
JAMES J. JOHNSTON,
ALEXANDER HAYS.